Figure 1:
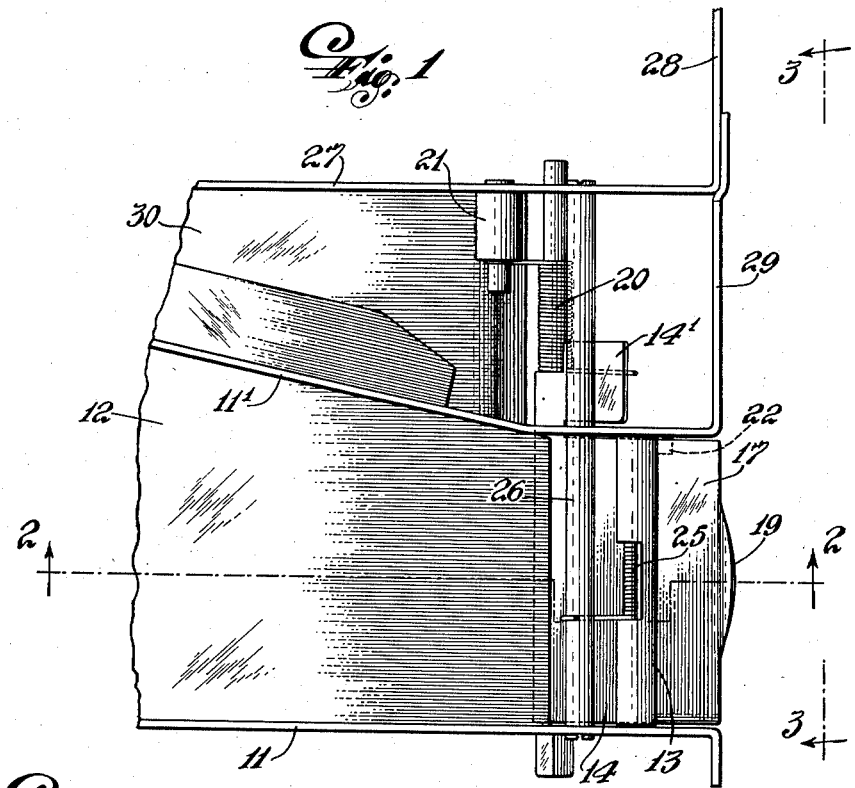

Nov. 20, 1951 G. L. KAUTZMANN ET AL 2,575,817
FARE BOX COIN UNIT
Filed Dec. 11, 1948 2 SHEETS—SHEET 1

INVENTOR.
G. L. KAUTZMANN AND
F. GRIFFITH
BY
ATTORNEY

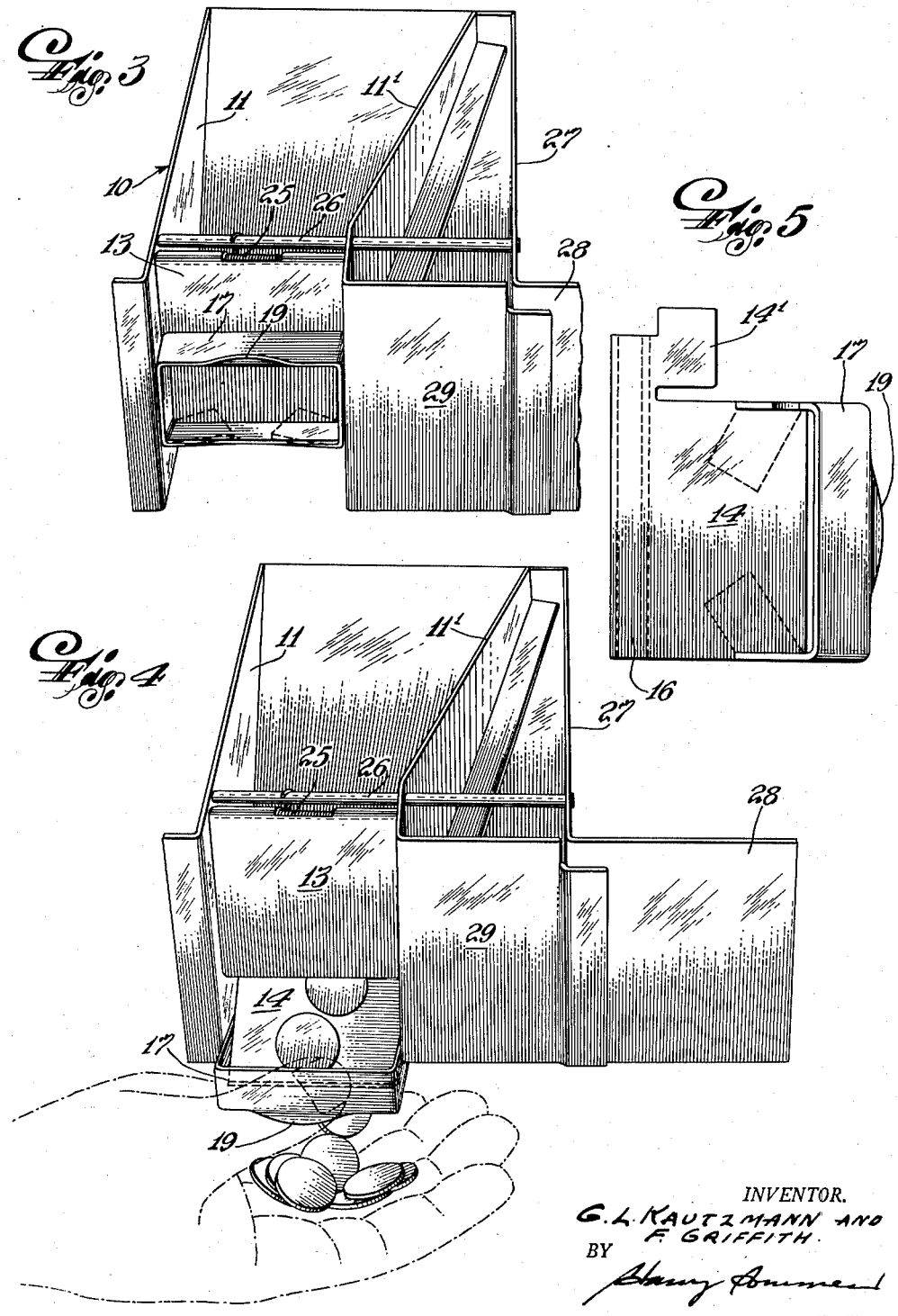

Patented Nov. 20, 1951

2,575,817

UNITED STATES PATENT OFFICE 2,575,817

FARE BOX COIN UNIT

George L. Kautzmann, Irvington, and Frederick Griffith, Denville, N. J., assignors to Public Service Coordinated Transport, Newark, N. J., a corporation of New Jersey Application December 11, 1948, Serial No. 64,888

5 Claims. (Cl. 232—7)

This invention is designed primarily for use in connection with fare boxes such as are used on public conveyances—for example, in busses, trolley cars, trains and the like, wherein fares are deposited in fare boxes, processed therethrough, and discharged from a fare box chute The invention of the instant application is designed to obviate the necessity of the operator using both hands to empty the fare box chute, and to further obviate the necessity of his performing any awkward or repeated operations to that end. Pursuant to the instant invention, the operator is enabled to rapidly and efficiently discharge the contents of the fare box chute into the palm of a hand by simply rotating a trap door portion of a gate, as will become apparent from the description hereinafter. The rotating operation is further simplified by preferably providing the gate trap door with an extended grip portion which may be engaged by the thumb while the remaining four fingers of the hand are cupped therebelow to receive the coins discharged through the open frame portion of the gate trap door.

These, and other advantageous objects, which will appear from the drawings, and from the description hereinafter, are accomplished by the invention, of which an embodiment is illustrated in the drawings. It will be apparent, from a consideration of said drawings and the following description, that the invention may be embodied in other forms suggested thereby, within the scope and purview of the instant invention, as set forth in the claims below.

Figure 2:
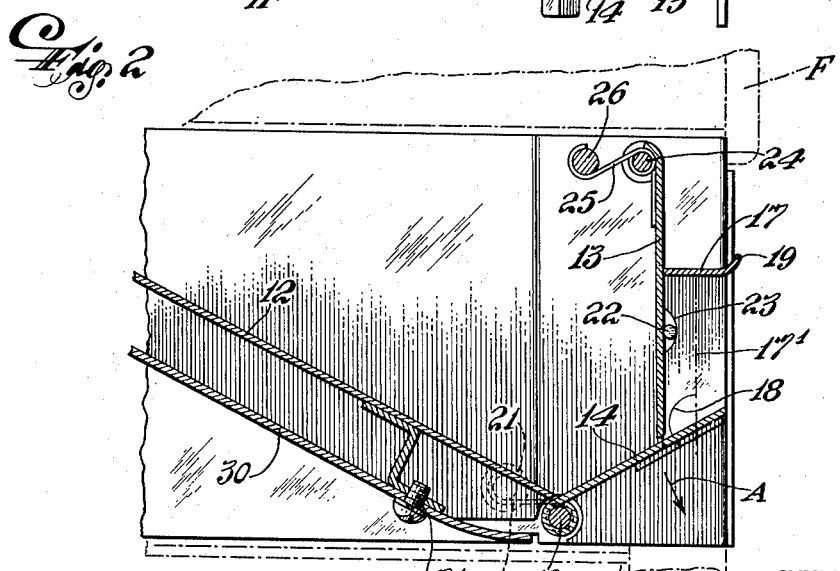

In the drawings:

Fig. 1 is a fragmentary, top plan view of a fare box chute casing embodying our invention, Fig. 2 is a vertical, longitudinal, elevational view thereof, taken on line 2—2 of Fig. 1, Fig. 3 is a perspective view thereof, taken on line 3—3 of Fig. 1, Fig. 4 is a view similar to Fig. 3, but showing the position of the gate trap door rotated to the discharge position thereof, and Fig. 5 is a top plan view of the gate trap door of our invention.

In the drawings, embodying a preferred form of our invention, the fare box chute casing (Fig. 3) is shown to comprise upstanding, spaced, side walls 11, 11' and a floor plate 12 postioned intermediate said walls at a downwardly inclined position and defining therewith the coin chute, the forward, lower end of the floor plate being preferably disposed substantially inwardly of the forward ends of the said walls 11, 11' (see Fig. 2). Means are provided to close the forward end of the chute from the top thereof down to a point substantially above the forward end of the floor plate. This end may be attained by providing an inspection plate or access door 13 which is so shown in Fig. 2. A gate trap door 14 is rotatably mounted in the chute at the forward end of the floor plate, as by means of the hinge pin 15 passing through the bearing 16 of the gate trap door 14. A U-shaped, open, frame 17 is fixed to the other end of the gate trap door or formed integral therewith, the plane 17' of the said frame 17 (Fig. 2) being preferably disposed at an obtuse angle 18 with respect to the axial plane of the main portion of the gate trap door 14. The frame 17 is further preferably provided with an extended grip portion 19. The inspection plate 13 is suspended at the front end of and intermediate the walls 11, 11' comprising, with the gate trap door 14, two sections of the gate for the fare box chute. In operation, the coins deposited into said chute from the upper portion F of the fare box (indicated in dotted lines in Fig. 2) roll downwardly on the inclined floor plate and come to rest against the trap door 14 (and also against the inspection plate if a large number of coins accumulates). To empty the chute, the operator rotates the trap door in the direction of arrow A of Fig. 2 by simply positioning his thumb on the extended grip portion 19 of the frame 17 of the gate trap door 14, rotating the same to the position at which the coins will be discharged through the open frame 17 (see Fig. 4).

Thus, the frame 17 constitutes a spout or nozzle to direct coins discharging from the fare box into the cupped hand of the operator, as depicted in Fig. 4. Moreover, the nozzle thus formed provides a positively defined shape against which the operator may place his hand to feel an outlet through which coins may issue, without the necessity of taking his eyes from the trafficway ahead.

In the construction shown in the drawing (which is a preferred form of the invention), the inspection plate 13 is rotatably disposed in the coin chute so as to normally hold the same in a vertical position responsive to the tension of spring means; the inspection plate may be rotated against the tension of the spring means, if desired, for access to the interior of the coin chute. This end can be obtained by a number of expedients, as shown, for example, in Figs. 1, 2 and 3, by journalling the inspection plate 13 on a hinge pin 24, journalled in the walls of the casing (Fig. 1), said hinge pin also holding a spring 25, the opposite ends of which (Fig. 2) engage the inspection plate 13 and bar 26, or other suitable bearing means. By this arrangement, the plate 13 is normally urged against stop pin 22 which precludes excessive rotation of said plate outwardly and fixes the normal vertical position thereof. The frame portion 17 of the trap door 14 normally rests against the outer face of the inspection plate 13, so that the gate trap door 14 and the inspection plate 13 form a substantially continuous, unbroken gate for the confinement of the coins. It is desirable to provide means for holding or urging the trap door 14 to the position just mentioned. In the drawings, one of many expedients adapted to that end is shown, comprising the hinge pin 15 which passes through the bearing 16 of the gate trap door 14, to rotatably dispose the trap door in the coin chute at the forward, lower end of the floor plate thereof, and a spring 20 positioned on the hinge pin, one end of said spring being disposed against a part of the casing or an anchor 21 fixed to the casing, as shown in Fig. 1, the other end of the spring bearing against the trap door 14 or an extended part 14' thereof (Fig. 5). By this arrangement, the gate trap door 14 is normally urged to a position in which the main portion thereof and the inspection plate 13 comprise a gate, and the frame portion thereof abuts the inspection plate 13. The trap door 14, when in the position shown in Fig. 2, engaging the stop 22, defines an angle opposed to the longitudinal axial plane of the floor plate 12, forming a barrier to arrest coins deposited thereon. To further assure the described interrelation of the parts, the U-shaped frame 17 of the trap door 14 may be provided with a notched portion 23 for abutment with the stop pin 22 (Fig. 2).

The structure of our invention is adapted to be used in connection with the standard type of fare box wherein the opening for the coin chute is substantially rectangular and, to that end, the casing 10 may have the wall 27 to give the same the desired width, said wall having an extended forward end angularly directed to define the front plate 28 against which the front plate portion 29 of the wall 11' may be positioned. Said walls may be secured together by any suitable means, as by welding, riveting or the like. The floor plate 12 may be bolted or otherwise secured to a portion 30 of the casing or of the fare box, as by means of bolts 31, this arrangement permitting the ready removal of the parts, or, if desired, it may be welded or otherwise secured thereto.

Having thus described our invention, what we claim as new and desire to secure by Letters Patent is:

1. The combination with a fare box having an inlet for the reception of coins thereinto and an outlet gateway for the discharge of coins therefrom, of a chute having a downwardly and outwardly inclined floor plate for the descent of said coins therealong, a swingable access door partially closing said gateway, biasing means urging said access door into normally closed position and yieldable upon application of inwardly directed pressure to said access door to permit inward pivotal movement thereof against said biasing means, a trap door pivoted at the outermost end of said floor plate and normally disposed in angular relation thereto to complement said access door to define therewith a closure for said gateway and simultaneously form a barrier against the descent of said coins, biasing means urging said trap door into normally closed position and yieldable to permit outward pivotal movement thereof to clear said gateway for the discharge of coins therethrough.

2. The combination with a fare box having an inlet for reception of coins thereinto and an outlet gateway for the discharge of coins therefrom, of a chute having a downwardly and outwardly inclined floor plate for the descent of coins therealong, a swingable access door suspended athwart the upper portion of said gateway for rotation upon a horizontal axis, biasing means urging said access door into normally closed position and yieldable upon application of inwardly directed pressure to said access door to permit inward pivotal movement thereof against said biasing means, a trap door pivoted at the outermost end of said floor plate and normally disposed in angular relation thereto to form a barrier against the descent of said coins and simultaneously complement said access door to define therewith a closure for said gateway, biasing means urging said trap door into normally closed position and yieldable to permit the outward pivotal movement thereof to form a terminal extension to said floor plate and clear said gateway for the discharge of coins therethrough.

3. The invention as defined in claim 1, and said trap door having a nozzle formed thereon and disposed in angular relation thereto whereby to position said nozzle in coin-receiving relation to said gateway upon the outward pivotal movement of said trap door.

4. The invention as defined in claim 2, and said trap door having a nozzle formed thereon and disposed in angular relation thereto whereby to position said nozzle in coin-receiving relation to said gateway upon the outward pivotal movement of said trap door.

5. The invention as defined in claim 3, and said trap door having a nozzle formed thereon and disposed in angular relation thereto whereby to position said nozzle in coin-receiving relation to said gateway upon the outward pivotal movement of said trap door, said nozzle having an integrally formed flange turned outwardly therefrom and defining a finger tab to facilitate manual manipulation of said trap door.

GEORGE L. KAUTZMANN.
FREDERICK GRIFFITH.

REFERENCES CITED

The following references are of record in the file of this patent:

UNITED STATES PATENTS

| Number | Name | Date |
|--------|------|------|
| 690,280 | Hendrickson | Dec. 31, 1901 |
| 2,288,222 | Bockstein | June 30, 1942 |